July 5, 1938.   F. A. HAYES   2,123,006
VARIABLE SPEED POWER TRANSMISSION MECHANISM
Filed June 18, 1932   11 Sheets-Sheet 7
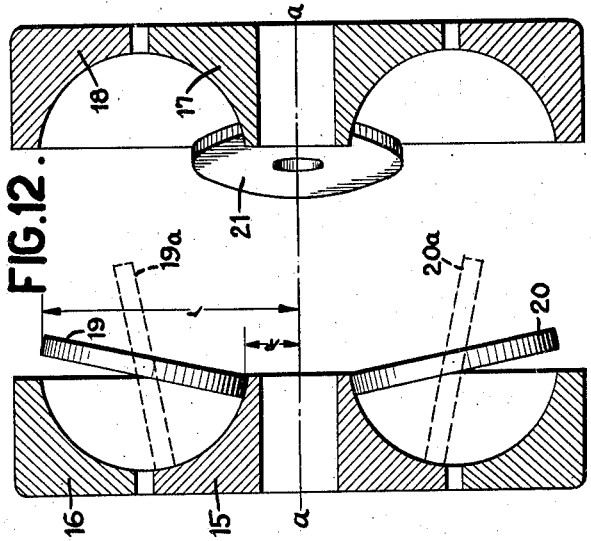
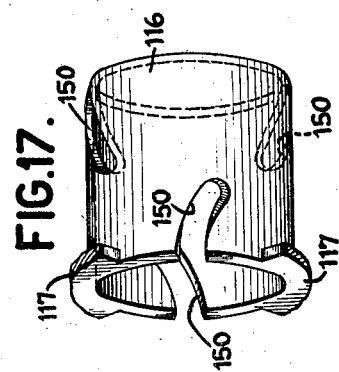
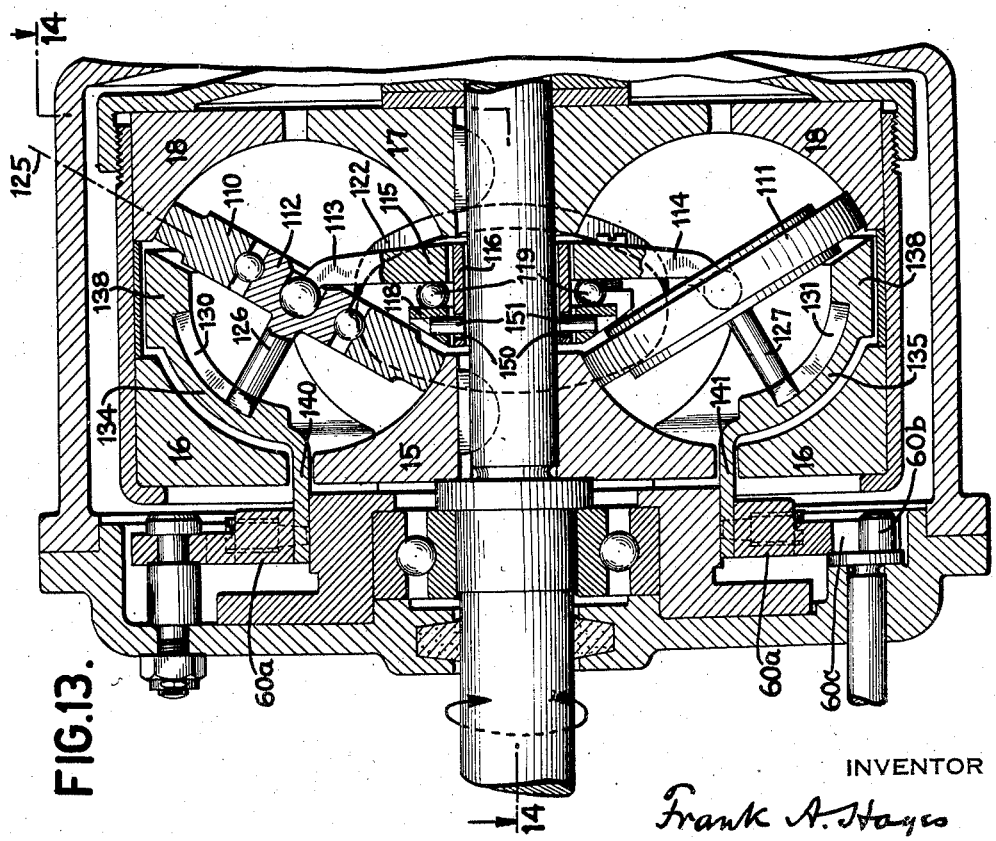
INVENTOR
Frank A. Hayes
BY his ATTORNEYS
Cooper, Kerr & Dunham July 5, 1938.  F. A. HAYES  2,123,006
VARIABLE SPEED POWER TRANSMISSION MECHANISM
Filed June 18, 1932   11 Sheets-Sheet 8

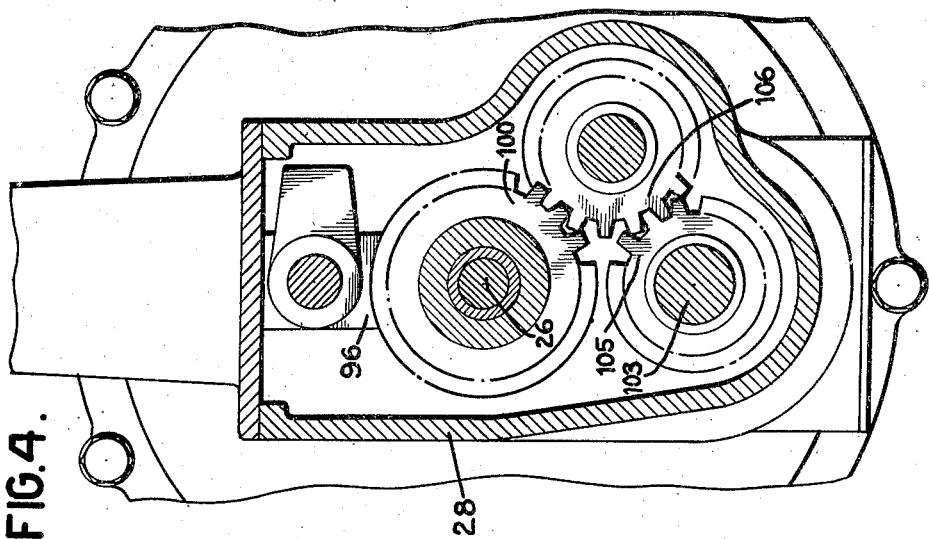
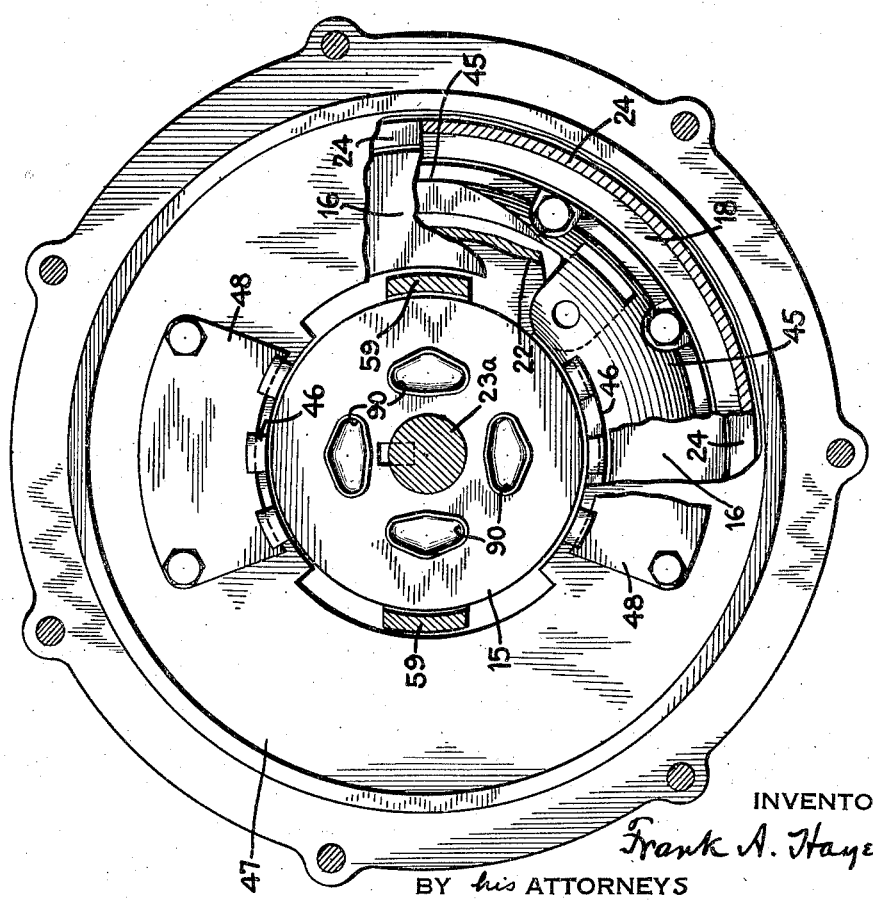

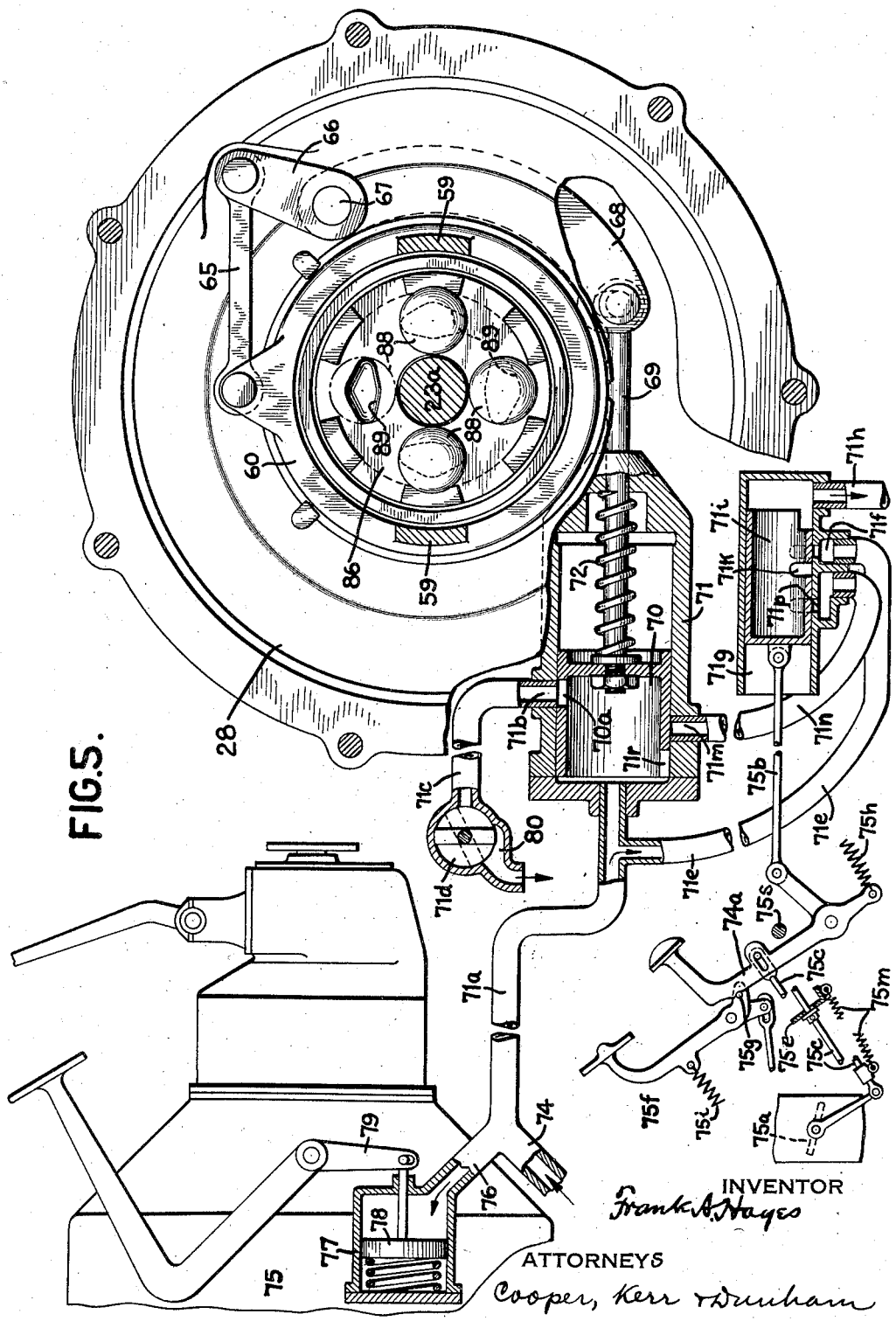

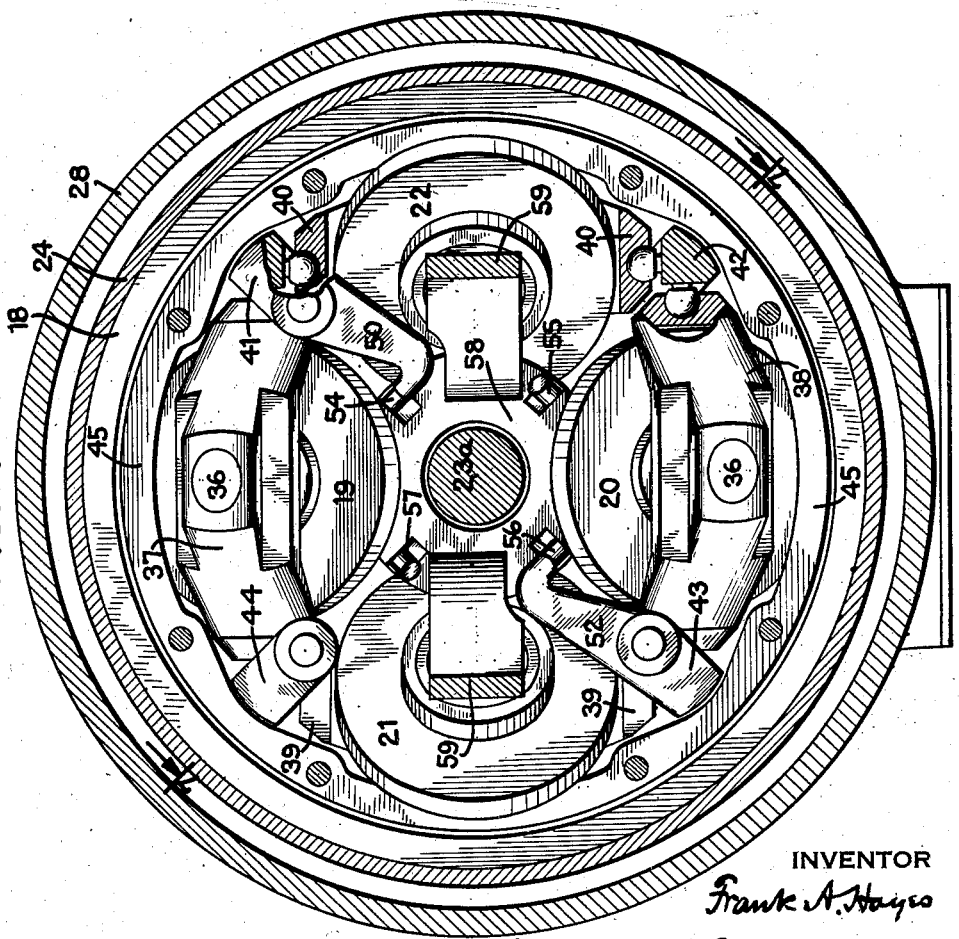

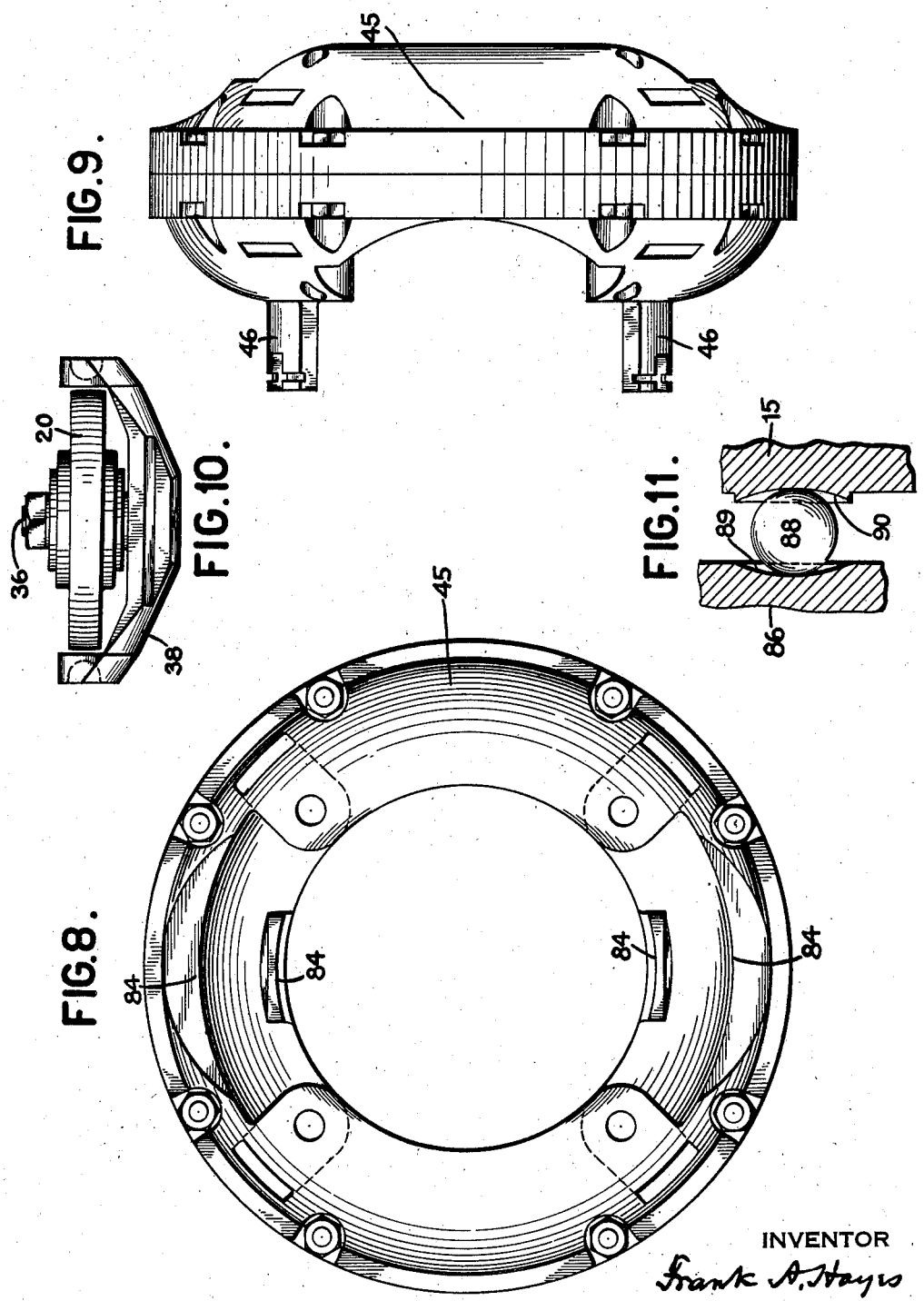

INVENTOR
Frank A. Hayes
BY his ATTORNEYS
Cooper, Kerr & Dunham

July 5, 1938.　　　F. A. HAYES　　　2,123,006

VARIABLE SPEED POWER TRANSMISSION MECHANISM

Filed June 18, 1932　　　11 Sheets-Sheet 9

INVENTOR
Frank A. Hayes
BY his ATTORNEYS
Cooper, Kerr & Dunham

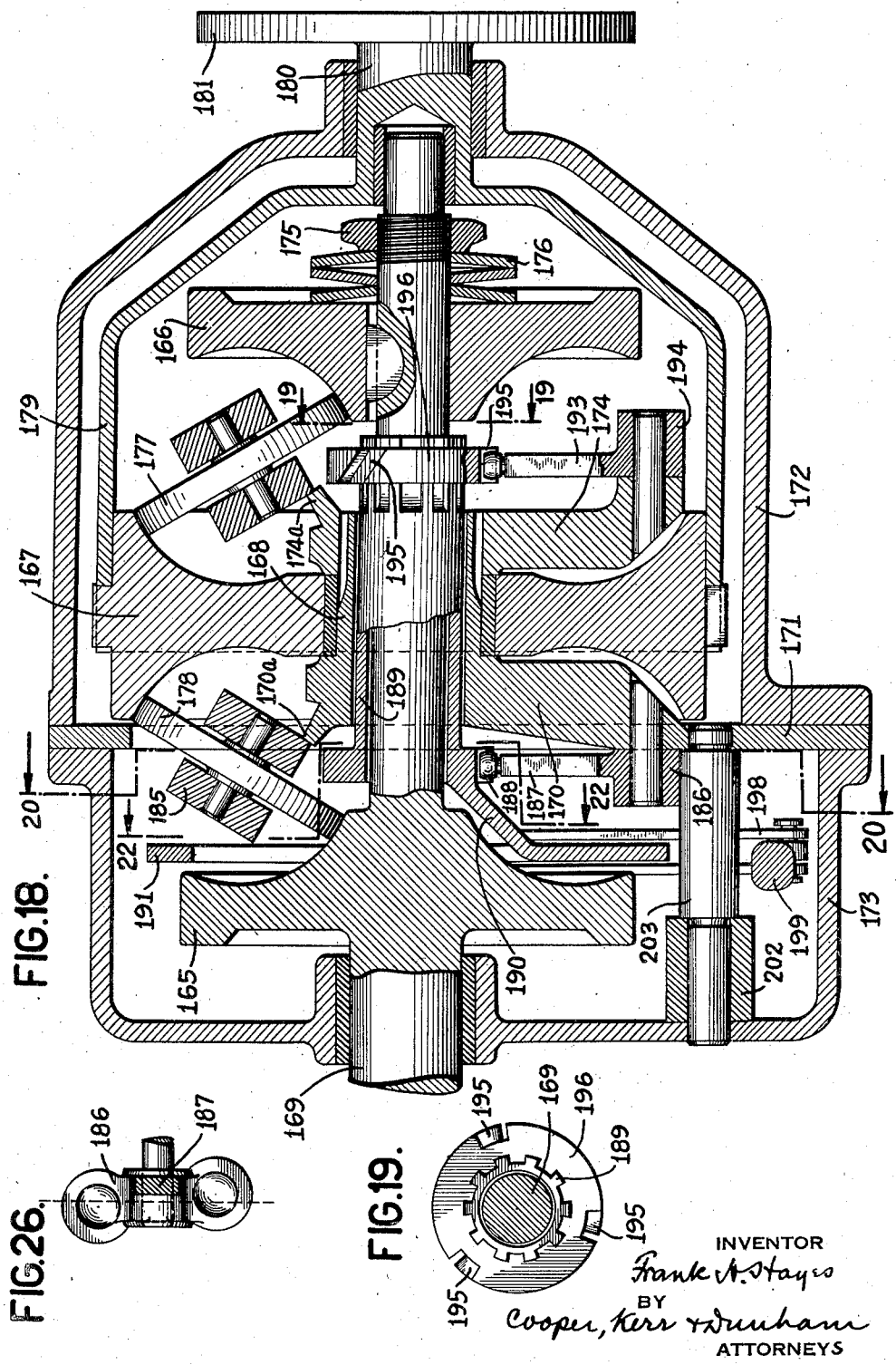

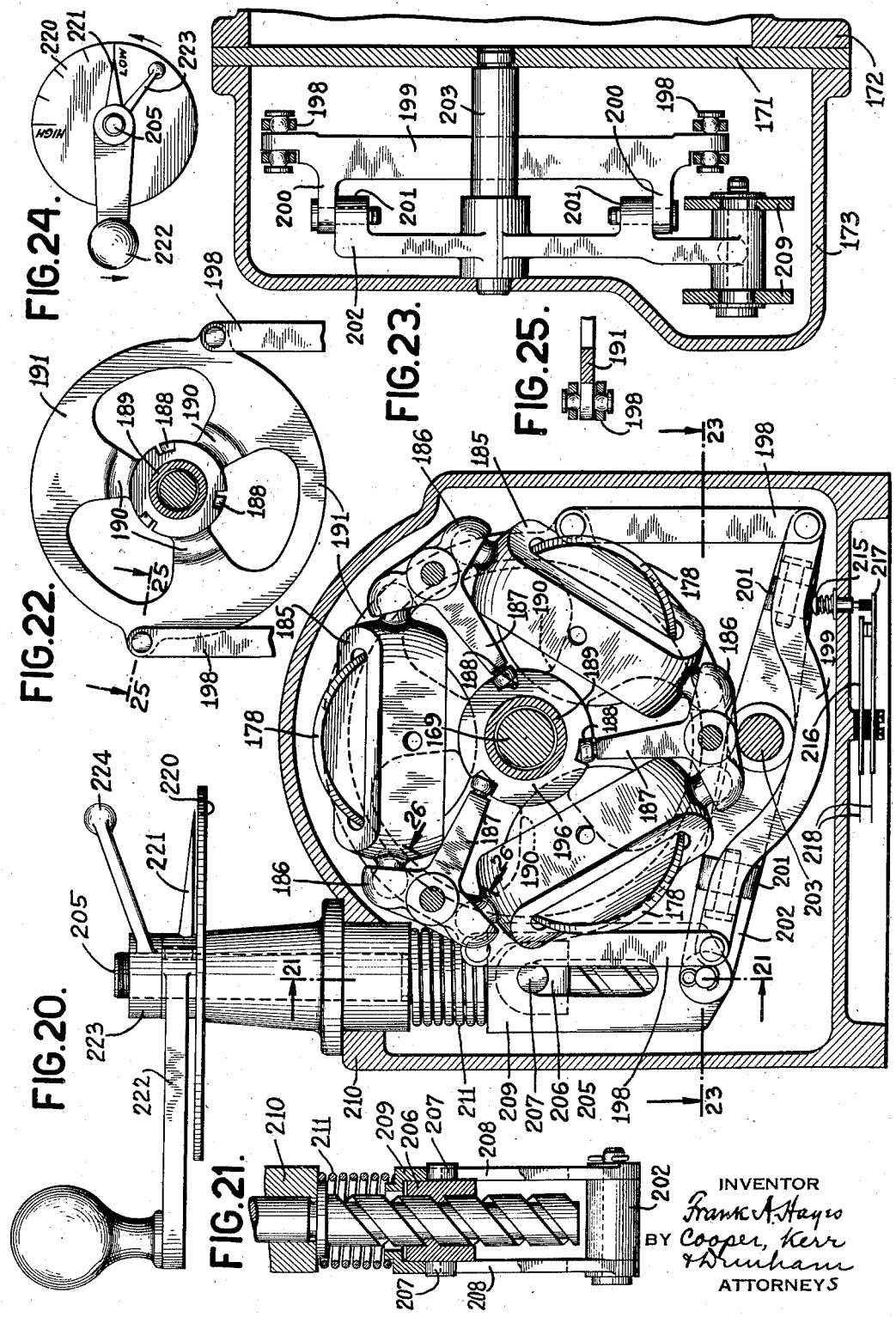

Patented July 5, 1938

2,123,006

UNITED STATES PATENT OFFICE 2,123,006

VARIABLE SPEED POWER TRANSMISSION MECHANISM

Frank A. Hayes, Middletown, N. J.

Application June 18, 1932, Serial No. 618,054
In Great Britain August 19, 1931

32 Claims. (Cl. 74—200)

This invention relates to variable speed power transmission mechanisms of the friction type, particularly friction transmissions in which power is transmitted from a driving shaft or other member to a driven shaft or other member through the instrumentality of friction disks and interposed friction rollers cooperating therewith. According to one feature of the invention it relates to mechanisms in which the roller centers are all approximately or exactly in the same transverse plane. Transmission mechanisms of this latter type have been proposed heretofore, but the prior constructions have all had the serious disadvantage that a moving thrust bearing is required to carry the pressure needed between the disks and rollers. If the mechanism is designed for maximum power capacity, using hard steel as the friction material (i. e., making the rollers and disks of hard steel) the pressures and rotation speeds necessary for maximum capacity are very high, and the balls in the aforesaid thrust bearing must be proportionately large, in some cases nearly if not quite as large as the rollers. This has led to various designs in which two sets of rollers are employed, spaced axially apart and connected to operate "in parallel" as regards power transmission; but this results in increased complication and greater bulk, making the mechanism relatively long, which is in many cases objectionable. Accordingly one object of the invention is to provide a compact mechanism of large capacity in proportion to its bulk. Another object is to provide a transmission mechanism possessing the simplicity of the type having a single set of rollers but having also the great advantage of the "parallel" or "duplex" type, in which the driving pressures are all self-contained and taken by stress in the operating parts themselves, thus making the aforesaid thrust bearing unnecessary. To these ends I use two sets of rollers, but instead of arranging them in axially spaced planes I locate them in the same plane, and what would be the middle disk in the usual type of transmission mechanism having two sets of rollers is made in two parts, transposed so that the grooves face inwardly toward each other. One part is then arranged in the same plane as one of the end disks and the other part is similarly arranged with respect to the other end disk. Preferably the two parts are secured together, to form, in effect, a ring concentric with and encircling the rollers and the two end disks. The result is that the disk-and-roller assembly is only about half as long, axially, as in prior constructions having two sets of rollers.

Another object of the invention is to provide simple and effective means for automatic equalization of load between the rollers of a set composed of two rollers, and between two such sets in a duplex or parallel type of transmission mechanism.

A further object is to provide simple and effective means for producing and controlling speed-ratio changes in transmissions of the type in which the disks are toroidally grooved and "precession" of the rollers is brought about by tilting the roller axes.

Another object is to provide a simple and convenient mounting for rollers of the tilting type just referred to.

A still further object is to provide a control system for use when the transmission mechanism is employed in an automobile between the engine and the driving wheels of the car, which is operable from the accelerator pedal to give low engine-speed and correspondingly high fuel economy under ordinary driving conditions but with high engine speed and correspondingly rapid acceleration of the car available at all times.

The manner in which these and other objects are attained by the present invention will be more readily understood from a description of the preferred embodiment. This embodiment, designed for transmitting power from the motor to the driving wheels of an automobile, is illustrated in the accompanying drawings, in which.

Figure 1:
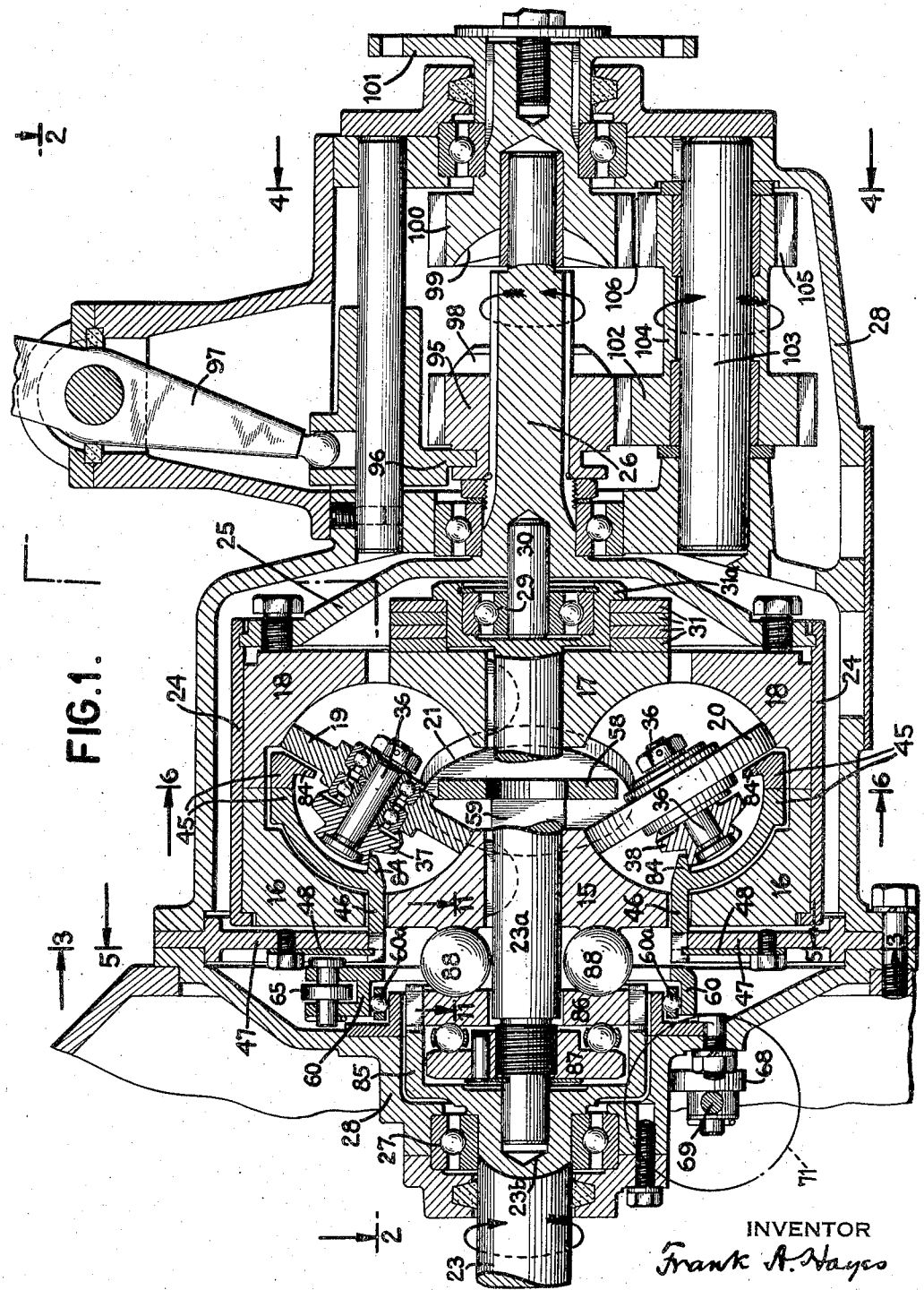
Fig. 1 is a central longitudinal section.

Figs. 3, 4, 5 and 6 are cross sections on lines 3—3, 4—4, 5—5, and 6—6, respectively, in Fig. 1, looking in the directions of the arrows.

Fig. 7 is a cross section on line 7—7 of Fig. 6, showing in elevation the rockers for two of the roller carriers, and the cage in which the carriers are mounted.

Fig. 8 is a view in elevation, looking from the right in Fig. 1, of the cage in which the two sets of rollers are supported.

Fig. 9 is a side view of the cage, from the left of Fig. 8.

Fig. 10 is a side view of one of the roller-carriers and the roller mounted therein.

Fig. 11 is a detail sectional view on line 11—11 of Fig. 1.

Fig. 12 is a diagrammatic section illustrating the principle of the invention. For the sake of clearness the disks in this figure are shown widely spaced axially.

Fig. 13 is a vertical section illustrating a roller system in which the rollers are supported by a ball and socket mounting instead of by carriers and rockers.

Figure 14:
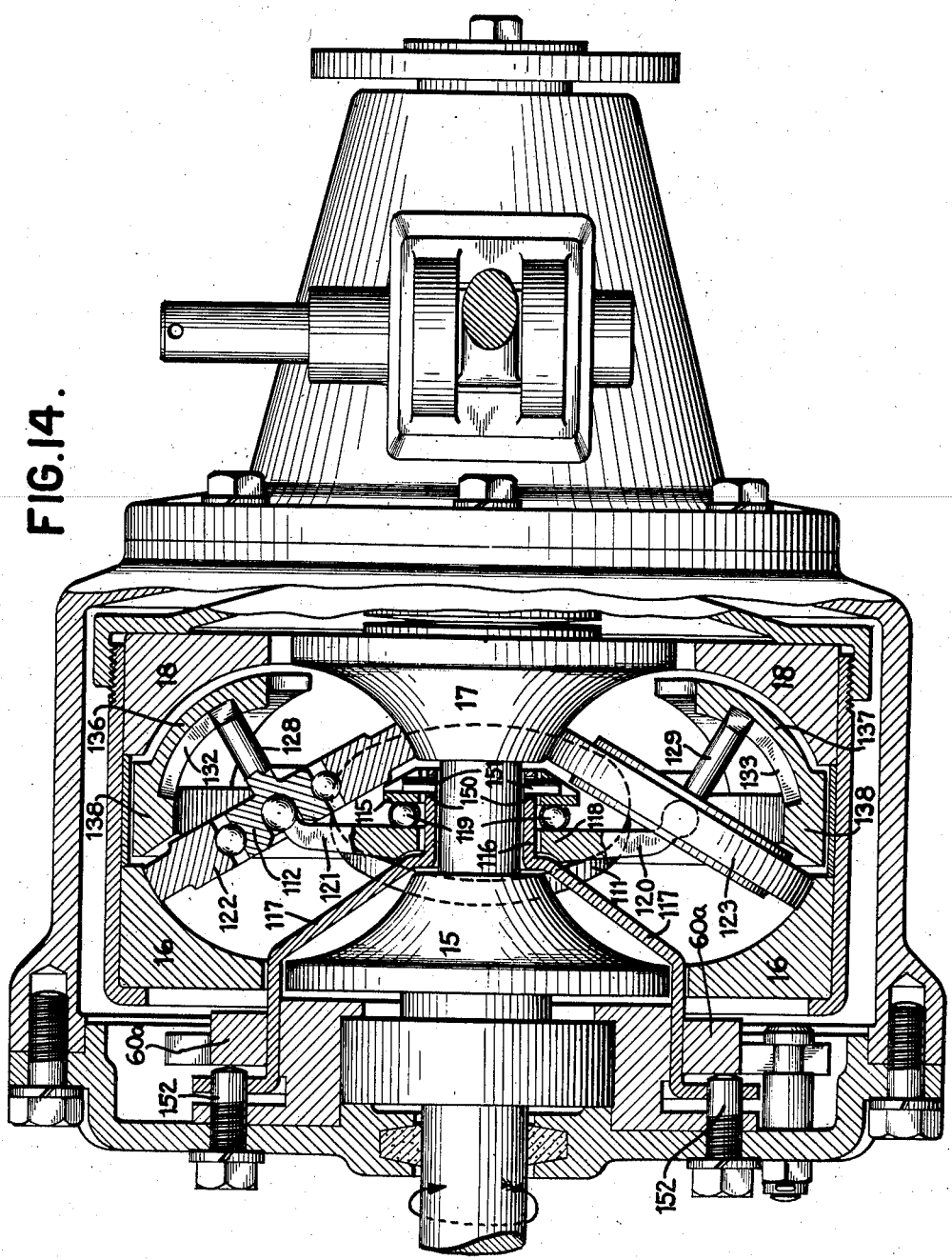

Fig. 14 is a sectional plan view on line 14—14 of Fig. 13.

Figure 15:
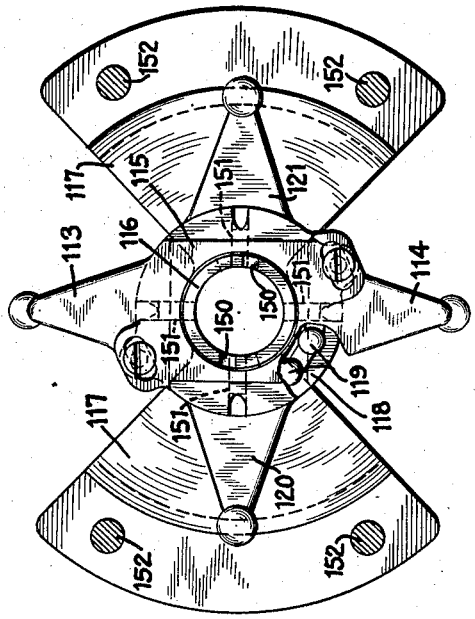

Fig. 15 is an elevation of the roller supports, taken from the right in Fig. 13.

Figure 16:
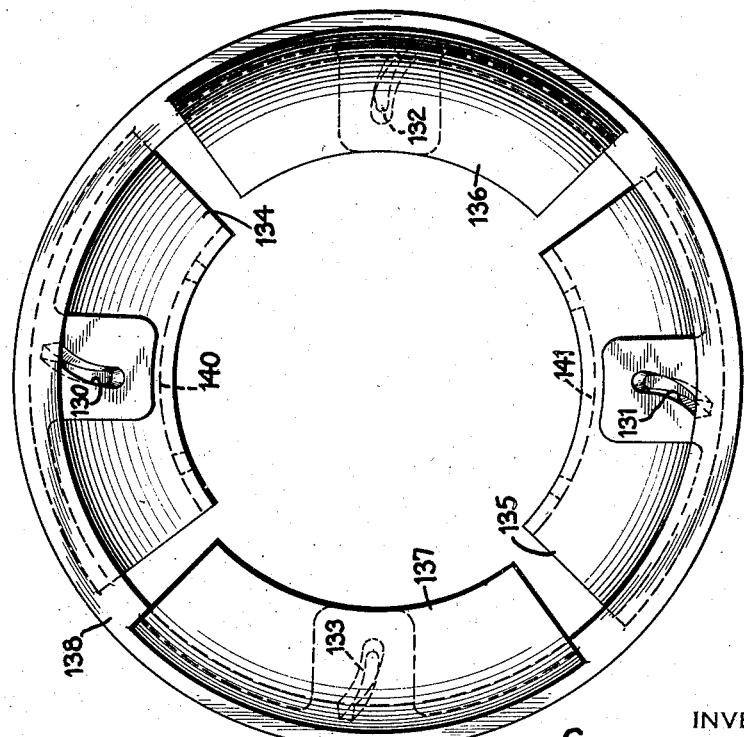

Fig. 16 is an elevation (from the right in Fig. 13) of the annulus or ring which tilts the rollers to produce change of speed ratio.

Fig. 17 is a perspective view of the equalizing member shown in Figs. 13 and 14.

Fig. 18 is a sectional plan view, taken about on the plane of the disk axis, illustrating another embodiment of the invention, in which the disks or races and the sets of rollers are spaced apart axially.

Fig. 19 is a detail section on line 19—19 of Fig. 18.

Fig. 20 is a cross section on line 20—20 of Fig. 18, showing manual means for rocking the rockers, which support the roller carriers, to initiate precession of the rollers.

Fig. 21 is a detail section on line 21—21 of Fig. 20.

Fig. 22 is a detail section on line 22—22 of Fig. 18.

Fig. 23 is a detail sectional plan view taken on a plane indicated by line 23—23 of Fig. 20.

Fig. 24 is a plan view of the controller crank and indicator shown in side elevation in Fig. 20.

Fig. 25 is a detail section on line 25—25 of Fig. 22.

Fig. 26 is a detail section on line 26—26 of Fig. 20, showing the offsetting of the sockets in the rockers, to incline the axes of precession of the roller and their carriers to the planes of the disks.

Figure 2:
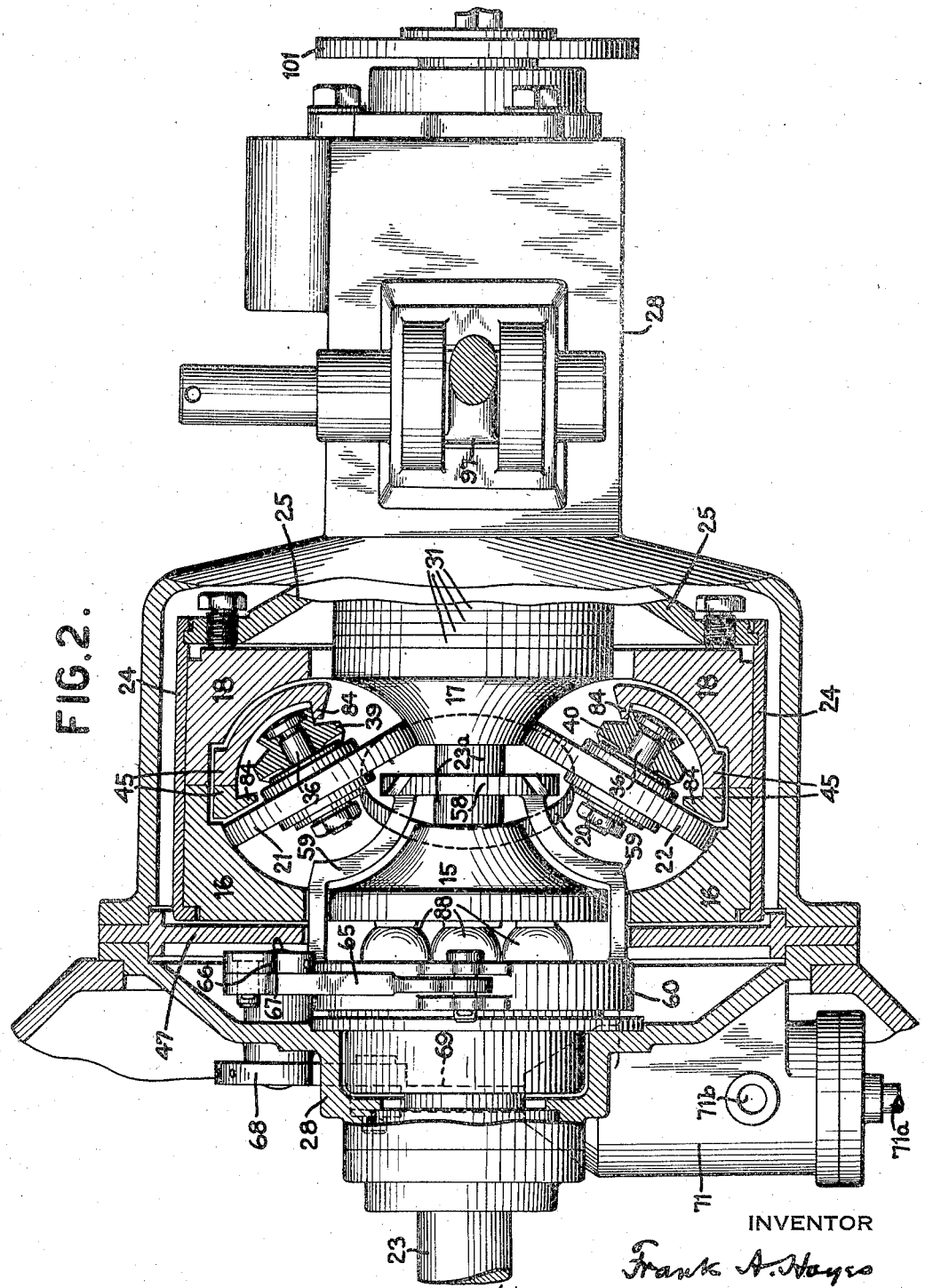
Fig. 2 is a sectional plan view on line 2—2 of Fig. 1.

Referring to Figs. 1, 2 and 12, four toroidally grooved coaxial disks or "races" are shown, designated 15, 16, 17, 18, with interposed rollers 19, 20, 21, 22. Disks 15 and 16 are in the same plane, and disks 17 and 18 are similarly arranged in a plane spaced axially from the first two. Disks 15 and 17 constitute an inner, and disks 16 and 18 an outer race element or member. Rollers 19, 20 cooperate with disks 15 and 16, and assuming that disk 15 is the driving disk (rotated by any suitable means, as for example shaft 23, on which disk 15 is keyed), and assuming also that the rollers can revolve in planetary fashion around the disk axis $a$—$a$ and that disk 18 is held stationary or non-rotatable, it will be seen that the rollers will revolve about the disk axis at an angular speed depending, other conditions being constant, upon the angle of the rollers to the disk axis or the planes of the parallel disks. Similarly, if the rollers are non-planetary and disk 18 rotatable, the latter will be rotated at a speed also depending upon the angular position of the rollers. Thus, with the rollers in the positions shown in full lines in Fig. 12, the speed of disk 18 will be low relative to the speed of disk 15, but as the rollers are turned to the dotted line positions 19a, 20a, the speed of disk 18 relative to the speed of disk 15 will increase. In general the speed of disk 18 is represented by the formula $N=n(R/r)$, in which N is the speed of disk 18 in revolutions per unit of time, $n$ the speed of disk 15, R (Fig. 12) the radius from the disk axis $a$—$a$ to the point of contact of the rollers on disk 15, and $r$ the radius to the point of contact of the rollers on disk 18. Rollers 21 and 22 cooperate in the same way with disks 17 and 16.

From inspection of Fig. 12 it will be clear that disks 15 and 17 may rotate at the same speed, in which case, with non-planetary rollers, disks 16 and 18 may be driven at the same or at different speeds, depending upon the relative angular positions of the rollers. On the other hand, if the rollers are planetary they must be set at the same angles to the disks since otherwise they would revolve, around the disk axis, at different speeds and hence would collide. It will also be seen that disks 16 and 18 may be the driving disks and disks 15 and 17 the driven disks; and that if the rollers are planetary they may be revolved to drive disks 16 and 18 if the disks 15 and 17 are stationary, or vice versa. One or another of the three elements, namely, the race element composed of disks 15—17, the race element composed of disks 16—18, and the roller element composed of the two connected sets of rollers, must be "stationary", that is to say, must not revolve around the disk axis. The stationary element, whichever it may be, then takes the reaction of the load and accordingly may be conveniently termed the reaction element.

Referring to the preferred embodiment, illustrated in detail in Figs. 1 to 11 inclusive, disks or races 15 and 17 having toroidal grooves or raceways are keyed on the driving shaft 23 and disks or races 16 and 18 having toroidal grooves or raceways are rigidly fixed in the encircling drum 24 which is connected by a spider or cone 25 to a driven shaft 26. Disks 16, 18 thus form, in effect, an internally grooved ring concentric with disks 15, 17. At one end of the apparatus the two-part driving shaft 23 is mounted in a ball bearing 27 carried by the housing 28 and its cupped other end is supported by a ball bearing 29 on a stud 30 mounted in the adjoining end of the driven shaft 26. A certain minimum frictional engagement of the disks and rollers is obtained by one or more spring washers 31 between disk 17 and the flange 31a on the cup. The rollers are non-planetary, and hence the speed of the driven shaft depends upon the ratio R/r (Fig. 12) and therefore upon the angular positions of the rollers, as will be readily understood.

Rollers 19, 20, Fig. 1, are mounted on ball bearings, whose inner races are mounted on studs 36 fixed in carriers 37, 38, and rollers 21, 22 (Fig. 2) are similarly mounted in like carriers 39, 40. One carrier, say 38, is shown in elevation in Fig. 10. The carriers are mounted by ball and socket joints at their ends in rockers 41, 42, 43, 44 (Figs. 6 and 7), having trunnions pivotally mounted in a supporting cage 45 (Figs. 8 and 9) having arms 46 extending outwardly between races 15 and 16 into connection with a supporting plate 47, Figs. 1 and 3. The arms 46 are toothed at their outer ends as indicated in Fig. 9, to engage teeth in the central aperture in plate 47, which is fixed between the two parts of the housing. Rotary displacement of cage 45 is thus prevented. Keys 48, cooperating with grooves in the teeth on arms 46, prevent axial movement of the cage. The cage and roller-carriers are thus held rigidly (but removably) in a fixed position or plane between the disks.

The rollers are caused to take different speed-ratio positions by the "precession" principle described and claimed in my prior United States Patent No. 1,698,229, issued January 8, 1929, and this precession is brought about by rocking the rockers 41, 42, 43, 44, as explained in my prior application Serial No. 361,031 now Patent No. 1,865,102, issued June 28, 1932. For this purpose the rockers are provided with arms 50, 51, 52, 53 (Figs. 6 and 7) extending radially inward and connected by inclined pins 54, 55, 56, 57, to inclined recesses in a centrally apertured circular plate 58 encircling the shaft 23 and carried by arms 59 extending out between disks 15 and 16 into connection with a control ring 60 (Figs. 1 and 2); so that when the ring is rotated the rockers 41, 42, 43, 44 are rocked in the cage 45, thereby shifting or displacing equally all the roller-carriers simultaneously and bodily in line with their axes of precession (which pass through the centers of the balls by which the carriers are supported) and thus causing the rollers to swing, or precess, on the said axes toward a higher or lower speed ratio position according to the direction of the displacement of the carriers, as explained in my prior Patent 1,865,102 referred to above. In accordance with the principle explained in the patent just mentioned the axes of precession are slightly inclined to the planes of the disks (for example by suitable location of the balls on the rockers or the sockets in the carriers) to cause the rollers, as they precess, to return to the position of equilibrium. So long as the axes on which the rollers rotate (not those on which they precess) intersect the axis of the disks, the rollers have no tendency to precess. When, however, the rollers are displaced in line with their axes of precession by rocking the supporting rockers the roller axes do not intersect the disk axis but pass the same on one side or another and precession at once begins; but as the precession continues the roller axes are swung back into intersection with the disk axis (because of the inclinations of the precession axes) and precession then ceases. The position of intersection is conveniently termed the equilibrium position.

To prevent all possibility of the rollers precessing too far in either direction the cage 45 is provided with stops 84, Figs. 1 and 2, arranged to be engaged by the roller carriers before the rollers themselves can pass off the disks or come into rubbing contact with any stationary part.

The control ring 60, Figs. 1 and 2, is connected by a link 65, Fig. 5, to a finger 66 on a rock shaft 67 which is connected by an arm 68 and rod 69 to a skirted control piston 70 in a control cylinder 71. A spring 72 urges the piston toward the position at which the control ring and rollers are in the low speed position, that is, with the rollers at angles such as are shown in Figs. 1 and 2. The cylinder is connected by a pipe 71a to a pipe 74 leading from a pump (which may be the lubricating pump, not shown, driven by the engine 75) supplying fluid under pressure, and hence the rightward movement of the control piston, and consequently the speed ratio position of the transmission rollers, depend primarily upon the speed of the engine, which in turn depends, other conditions being the same, upon the opening of the throttle 75a by actuation of the accelerator pedal 74a which is connected to the throttle by a rod 75c. In the side of the control cylinder 71 is a port 71b connected to a drain pipe 71c discharging into the sump or other receptacle (not shown) from which the pressure fluid is pumped. This drain pipe is provided with a valve 71d, and the skirt of piston 70 has an opening 70a which registers with the drain port 71b when the piston is in a low speed position as indicated in the figure. Pipe 71a is also connected by pipe 76 to a cylinder 77 containing a spring-actuated piston 78 connected to an arm 79 which operates the usual clutch, which may be between the engine and the transmission mechanism or between the latter and the propeller shaft which is connected to the driving wheels through the differential. The spring in the cylinder tends to disengage the clutch, and does so unless the oil pressure back of the piston is sufficient to overcome the spring. With the engine idling and the valve 71d in the position shown in full lines the oil from pipe 74 escapes freely to the sump by way of ports 70a, 71b and pipe 71c and hence the pressure is insufficient to advance the control piston or engage the clutch but as the driver speeds up the engine the clutch piston 78 is gradually advanced and the car starts, the control piston 70 remaining in the low speed position. As soon as the car starts, further speeding up the engine increases the oil pressure sufficiently to advance the control piston, thereby causing the transmission rollers to precess to a higher speed ratio position. Up to a certain point this precession will continue (to higher and higher speed ratio positions) as long as the engine continues to increase in speed and therefore continues to advance the control piston 70; but when the latter ceases to advance, the precession of the rollers brings the roller axes (i. e., the axes on which the rollers rotate) again into intersection with the disk axis and the precession then ceases. If at any time the load reaction exceeds the torque of the engine the latter is slowed down and the oil pressure is correspondingly decreased, permitting the rollers to precess to lower speed-ratio positions until the engine torque and load reaction are again in balance. Other conditions being the same, this decrease of speed-ratio can only be prevented by increasing the throttle opening, thereby keeping up the speed of the engine.

As the operator turns the control valve 71d thereby uncovering the by-pass channel or passage 80, more and more oil passes through pipe 71c to the sump, and less pressure is developed on control piston 70, thereby decreasing the tendency of the rollers to take higher speed-ratio positions as the engine speed increases, and when the valve is turned far enough, say to the dotted line position, the pressure on clutch piston 78 is insufficient to hold the clutch engaged and the engine is disconnected from the transmission mechanism. This adjustment of the valve is useful for starting and "warming up" the engine, for purposes of test and repair, and also provides for adjustment of the relation of engine speed to car speed at the will of the operator. At the same time the control piston remains in the low speed-ratio position ready for starting the car when the valve is again turned to the running position.

Pipe 71a is also connected by pipe 71e to a port 71f in a valve cylinder 71g having a drain 71h leading to the sump. In the cylinder is a sliding sleeve valve 71i provided with a port 71k and connected by a rod 75b to the accelerator pedal 74a in such manner that when the pedal is in the position at which the throttle is closed as far as permitted by the stop 75e the port 71k is at the left of port 71f and the latter is therefore closed.

Control cylinder 71 also has a port 71m, connected by pipe 71n to a port 71p in valve cylinder 71g so that as the sleeve 71i is advanced by depression of the accelerator pedal, port 71k in the sleeve can be brought into register with said port 71p in the valve cylinder. Control piston 10 has a port 11r which opens port 11m when the piston reaches a certain position in its advance or rightward movement. The purpose and operation of these devices are as follows.

In the first place, the gear ratio at the differential of the car, that is, between the driving shaft or propeller shaft and the driving wheels, is made "low," for example 2 to 1; which means that with a conventional sliding-gear transmission, in direct drive or "high" speed, the engine would make two revolutions to one of the driving wheels. With such a transmission a ratio of 2 to 1 would usually be too low, as is well understood, and a conventional value would ordinarily be used. Secondly, the port 11m in the control cylinder 11 is located not at the point (in the rightward path of the piston) at which the speed ratio of the transmission mechanism has its highest value, but at the point at which, with due regard to the low gear-ratio at the differential and the power of the engine, the engine can drive the car with the maximum velocity.

With the control devices in the positions shown in Fig. 5, the car standing still and the engine idling, to start the car the operator depresses the accelerator pedal in the usual way. The clutch is engaged at once, and as the car velocity increases, the operator depresses the pedal fully, thereby giving the throttle its widest opening and bringing port 11k of valve 11i into register with port 11p. The inertia of the car, however, keeps the engine speed down. As the car velocity increases, the engine speed increases and the control piston 10 advances, with the result that the car accelerates rapidly. Desiring to attain the maximum car velocity the operator keeps the pedal depressed. If, then, the load and road conditions do not prevent (by keeping the engine speed down), the advancing control piston 10 opens port 11m, permitting enough oil to escape through pipe 11n, port 11p and registering port 11k to prevent further advance of the piston, thereby keeping the transmission mechanism at the speed ratio which, with the gear ratio at the differential and the power of the engine, will enable the engine to drive the car at maximum velocity. If the velocity thus attained is too high the operator simply lets the pedal rise, as he naturally would. The first effect of this is to move the valve sleeve 11i rightwardly far enough to close port 11p so that oil can no longer escape through pipe 11n, whereupon the control piston begins to advance and is now in the "overdrive" range. This has the effect of operating the car at maximum engine torque but reduced engine speed, resulting in high economy of operation. If the pull of the engine at the maximum over-drive is sufficient to drive the car faster than desired, the operator continues to raise the accelerator pedal in the usual way, thus closing the throttle until the desired velocity is attained. If the pull of the engine is not enough at the maximum over-drive ratio to drive the car at the desired velocity the operator depresses the pedal again far enough to partially open port 11p, thus reducing the pressure in control cylinder 11 and allowing piston 10 to recede until the proper ratio for the desired velocity is obtained. The car is now traveling at the desired velocity. At the same time the throttle is practically wide open and the engine is therefore operating at a high efficiency. Coming to an up-grade and desiring to maintain his speed, the operator depresses the accelerator pedal, thereby opening more or less the port 11p in valve cylinder 11g through port 11k in sleeve 11i. The resulting decrease of pressure behind the control piston permits the latter to drop back, with corresponding decrease of the speed ratio of the transmission and increase of engine speed and pull on the driving wheels. If the engine then begins to slow down, the resulting decrease of oil pressure lets the piston move back still farther and open port 10a still farther. This farther relief of the pressure (through valve 11d) permits the piston to move back farther still, making it still easier for the engine to carry the load. If the engine does not maintain the desired car velocity, with the accelerator pedal fully depressed and port 11p therefore wide open, the continued decrease of engine speed may permit the control piston to move back far enough to close port 11m. The transmission mechanism is now below the overdrive range, and with increasing load resistance the piston may move back to the extreme low speed position, at which the maximum pull is delivered to the driving wheels. If at any time before port 11m is closed by the leftward movement of the piston and the car velocity increases too much, the operator simply lets the accelerator pedal rise, thereby restricting port 11k more or less, or even closing it entirely, and causing increased pressure behind the control piston and corresponding increase of speed ratio, decrease of engine speed, and corresponding decrease of car velocity.

From the foregoing it will be seen that by proper design of the parts, location and shape of the various ports, etc., the movement of the accelerator pedal necessary to control the speed of the car by opening and closing the port 11p can be made to have only relatively slight effect on the throttle opening, which means that under average driving conditions the throttle can be practically wide open; and this without any change in the accustomed use of the accelerator by the driver. That is, to increase the speed of the car the pedal is depressed, thus opening port 11p and thereby decreasing the pressure on the control piston and permitting the engine speed to increase (and with it the car velocity) without increasing the speed ratio of the transmission mechanism. While to decrease the speed of the car it is only necessary to let the pedal rise, thus closing port 11p and thereby causing the transmission mechanism to "change up" so fast in the over-drive range that the engine speed, and car velocity, are kept down. At any time, however, if the load resistance is so high that port 11m in the control cylinder is closed by the receding piston and transmission mechanism is then in a low speed ratio and, port 11b being wide open, a relatively high engine speed, depending on the adjustment of valve 11d, can be attained without causing the piston to advance.

To stop the car it is only necessary to let the accelerator pedal rise and apply the brakes. Sudden stops may stall the engine, with the control piston in an advanced position and ports 11b and 11p both closed, in which case the clutch would remain engaged by reason of the oil trapped in the fluid pressure system, and the engine could not be started again. To obviate this difficulty a release pedal 15f is provided which may be positioned for operation by the left foot, in place of the usual clutch pedal. Then before attempt is made to start the engine this pedal is depressed, causing its pin 15g to lift the accelerator pedal and thereby shift the valve sleeve 11i rightwardly, bringing port 11k into register with the port 71f. This gives the entrapped oil an outlet, permitting the spring in the clutch cylinder to disengage the clutch, and the spring in the control cylinder to retract the control piston to the low speed position. The relief pedal may be the brake pedal. In either case, whether the relief pedal is in place of the clutch pedal or is the brake pedal, the operator in stopping the car would naturally depress the pedal, thereby preventing the engine from stalling.

Springs 75h, 75i balance each other and prevent the two pedals from flopping about when the throttle is closed by spring 75m and neither pedal is engaged by the foot. A stop 75e limits the upward movement of the accelerator pedal to the point at which port 71k is in register with port 71f.

The amount of power transmissible to the load on the driven shaft 26 depends, other things being the same, upon the friction between the rollers and the disks, with the result that overload may cause slippage, with resulting wear and damage. This may be obviated by making the pressure of the disks or races on the rollers great enough; but in that case the pressure is unnecessarily high for lighter loads. Accordingly the present invention includes a novel torque loading construction by which the pressure between the rollers and disk depends upon the load resistance, increasing as the latter increases, and vice versa, though not necessarily in a strictly linear manner. For this purpose the inner part 23a of the two-part driving shaft 23, Fig. 1, is journaled at its outer end in the outer part 23b which is equipped with a cup 85 having teeth in its edge cooperating with teeth on the periphery of a cam member or collar 86 rotatable and axially movable on the inner shaft-part 23a. Threaded on the journal of the latter is a ball thrust bearing 87, and between the collar 86 and the disk 15 are three or more balls 88 working in cam grooves or depressions 89 in the collar (see Figs. 3 and 11) and similar depressions 90 in the disk. Each groove deepens gradually from its ends to its central portion. From study of the construction described it will be seen that if there is overload on the mechanism the shaft 23b will run ahead of disks 15 and 17 and shaft 23a. As this occurs the balls 88 are rolled into shallower parts of the cooperating depressions or recesses, thus urging disk 15 toward the right, and collar 86 (and with it the shaft 23a and disk 17) toward the left, thereby increasing the pressure of disks 15 and 18 on rollers 19, 20, and the pressure of disks 16, 17 on rollers 21, 22. The friction of these parts on each other is thus increased so that no slip of one on the other can occur. It will be observed that the operation described is entirely automatic. If at any time the load reaction on shaft 23b is decreased the lessened tendency of shaft 23a to lag permits the balls to roll back to deeper parts of the recesses, thereby decreasing the pressure exerted on the disks and rollers. In this way the pressures of the parts on each other is always proportional to the load and unnecessarily high stresses and losses are avoided. It will also be observed that in the action described there is no rotary movement of disk 15 relative to disk 17, or vice versa. This is a novel and advantageous feature, since such relative rotation would cause one set of rollers to drive the rigidly connected disks 16—18 at a different rate than the other set, with resulting slip and wear which would sooner or later cause serious damage. It is advantageous to have the pressure-producing mechanism at the driving end of the apparatus but it may be positioned at the other end if desired. The pressure-producing mechanism described in this paragraph is not claimed in the present application but is claimed in my copending divisional application Serial No. 186,016, filed January 21, 1938.

The speed ratio control plate 58, by which the rockers are actuated to produce speed ratio changes, also constitutes an equalizing device to produce automatic equalization of the load between the two sets of rollers. In performing such function the plate moves axially in one direction or the other, and to permit the slight movement necessary a clearance is provided for the control ring 60, Fig. 2, on both sides of the same, and the link 65, Figs. 1 and 2, is loosely connected to the ring or to the arm 66 or both. The plate 58 also effects equalization between the rollers of each set. In performing this function it moves transversely or radially of the disk axis. In this movement the plate, the arms 59, and the control ring 60 tilt as a whole on the ball bearing 60a, Fig. 1, the balls of which work on ungrooved races.

Assuming that the driving shaft 23, Fig. 1, is rotating in the direction of the arrow, i. e., clockwise as viewed from the left, it will be seen that the ring or disk assembly 16—18 and driven shaft 26 will be rotated in the opposite direction, which would drive the car in the forward direction. To permit forward or reverse drive at will the gear system housed in the rear part of the casing 28 is provided, as illustrated in Figs. 1 and 4, comprising a gear 95 splined on shaft 26 and shiftable by a fork 96 and hand lever 97 to bring its clutch teeth 98 into engagement with the cooperating teeth 99 in the face of gear 100 which is connected with the driving flange 101. When the clutch is engaged forward drive is obtained. When the gear is shifted to the position shown in the drawings it is meshed with gear 102 rotatable on the countershaft 103 and connected by sleeve 104 to gear 105 meshing with a reverse idler gear 106 which in turn meshes with gear 100, thus giving reverse drive.

The form of the invention illustrated in Figs. 13 to 16 differs from the first in the manner in which the rollers are mounted and controlled. In this second form the rollers 110, 111 are mounted on ball bearings whose inner races, as 112, constituting carriers for the rollers, are supported by ball and socket joints on the radial arms 113, 114 of plate 115 (Fig. 15), which forms a floating support for rollers 110, 111, and is capable of slight rotary movement about a sleeve 116 carried by arms 117 extending outwardly through the annular space or gap between disks 15 and 16. Alongside of plate 115 is a similar plate 118, spaced from the first by a ball bearing 119, having radial arms 120, 121 (at right angles to the arms 113, 114), on which rollers 122, 123, Fig. 14, are carried by ball and socket joints. Each plate is capable of slight radial movement in directions transverse or at right angles to its two roller-supporting arms.

Referring to Fig. 13, if the roller 110 is tilted on an axis indicated by dotted line 125, coplanar with the disk axis, the roller will precess on an axis perpendicular to the plane of the figure and passing through the center of the ball on which the roller is supported. Assuming that disk 15 is rotating counterclockwise as seen from the right, and that the roller is tilted counterclockwise as seen from the upper end of axis 125, the roller will precess clockwise toward a higher speed ratio position. Similarly, if the roller is tilted (on axis 125) in the other direction it will precess to a lower speed ratio position. For the purpose of tilting the rollers to bring about automatic and progressive or gradual change of speed ratio by precession in the manner just described, they are provided with axial stems or arms 126, 127, 128, 129, extending loosely into helical slots or grooves 130, 131, 132, 133 formed in arc-shaped flanges 134, 135, 136, 137 on a ring 138 arranged between the disks 16 and 18. This ring is provided with a pair of arc-shaped arms 140, 141 which extend out through the annular space between disks 15 and 16 for connection with a suitable control ring 60a, which may be rotated by a crank pin 60b working in a radial slot 60c. Keeping in mind the construction just described, it will be seen that if control ring 60a is given a slight rotary movement the roller stems, and with them the four rollers, will be tilted, some in one direction and some in the other, according to the direction in which the ring was rotated, thereby causing the rollers to rock or precess toward higher or lower speed ratio positions, as the case may be.

Rotation of the ring 128 in the clockwise direction (as viewed from the left of Figs. 13 and 14) swings stem 126 of roller 110 upwardly and the stem 127 of roller 111 downwardly, thereby tilting the rollers correspondingly and causing the two to precess to higher speed ratio positions. As the roller 110 precesses, its stem 126, Fig. 13, moves clockwise in the helical groove 130, and upon reference to Fig. 16 it will be seen that since the groove has a righthand twist (relative to the axis of precession) the movement of the stem therein swings the stem downwardly (in Fig. 13), thus tilting the stem and roller back toward the position of equilibrium, in which position the axis of rotation of the roller intersects or is coplanar with the axis of the disks. As the precession continues the roller eventually reaches the full equilibrium position, and at that position its precession ceases, leaving the roller in a new, and higher, speed ratio position. Evidently the extent of this reverse tilt is in every case equal to the initial or forward tilt which caused the precession, and it will therefore be clear that the farther the roller is tilted to initiate the precession the farther will the roller precess and the higher will be the new speed ratio. It is also evident that if the roller is in the extreme high or in any intermediate position between the highest and lowest, rotation of the control ring 60a in the counterclockwise direction as seen from the left of Fig. 13 will swing stem 126 down on its ball and thereby cause the roller to precess to a lower speed position. Upon reflection it will be clear that rotation of the control ring has the same effect upon roller 111 as upon roller 110; except that to cause precession of roller 111 from the low speed position of Fig. 13 to a higher position, arm 127 must be tilted downwardly, that is, away from the observer looking at the figure named. And of course rollers 122 and 123, Fig. 14, operate in the same way as the other two.

The sleeve 116, which extends through the plates 115, 118, is provided at its ends with inwardly extending inclined or helical slots 150, engaged by radial pins 151 mounted in the plates 115, 118 with a smooth fit permitting the plates to move transversely to the disk axis as mentioned hereinbefore. The sleeve is non-rotatable but is capable of slight axial movement in both directions, and for this purpose the arms 117 which support the sleeve are mounted to slide on studs 152 suitably fixed in any convenient stationary part. The sleeve constitutes an equalizing device and effects automatic equalization of the load between the sets of rollers and between the rollers of each set, as will now be described.

Suppose that in its precessional movement, say toward a higher speed ratio position, roller 110, Fig. 13, should run ahead of roller 111. In such case it drives disk 18 faster than roller 111 drives it, and hence roller 111 tends to roll upwardly on the disk, toward the observer. At the same time roller 110 also tends to roll up on the disk, toward the observer, since it is transmitting the larger share of the power and is subjected to the drag exerted on the disk by the other roller. Both rollers, therefore, roll upwardly on the disk, the plate 115, which carries the roller-supporting arms 113, 114, sliding on its pins 151, Fig. 14. In such movement the stem 126 of roller 110 swings upwardly on its end in groove 130 as a pivot. This is in fact a down-swing on its supporting ball; and remembering that such down-swing produces precession toward a lower speed position it will be seen that the roller precesses in that direction, and that as it does so the stem swings up on its ball support and brings the roller to equilibrium position. At the same time, the stem 127 also swings upwardly on its end in groove 131 as a pivot, which movement is in fact a down-swing on its supporting ball, and accordingly roller 111 precesses to a higher speed position. The net result is that the two rollers take the same intermediate position, at which they drive disk 18 at the same speed. It will be observed that the roller-supporting plate 115, which supports the rollers 110, 111, Fig. 13, floats on the pins 151, 151, Fig. 14 (the pins shown in a horizontal position in Fig. 15), so as to be free to move transversely of the sleeve 116 and the axis of the disks or races in response to variations of the torque transmitted by any one of the rollers of the set composed of rollers 110, 111, and that such transverse movement, causing precession or tilting of one roller on its axis of precession to a lower speed-ratio position, and the other to a higher speed-ratio position, serves to bring both rollers of the set to an intermediate position at which they transmit equal torque. Similarly, in the other set, floating plate 118 serves, by its transverse movement at right angles to the equalizing movement of plate 115, to adjust rollers 122, 123, to positions at which they also transmit equal torque. In each case the floating roller-supporting plate is normally centered, that is, with the disk axis. When the roller supporting plate moves transversely of the axis of the disks or races the axes of rotation of the rollers carried by the plate are displaced so that these axes no longer pass through the disk axis, with the result that the rollers precess in the directions necessary to bring them to the speed-ratio position in which they transmit equal torque.

Again, suppose one set of rollers takes a different speed ratio position from the other set, the lagging set, say 110, 111, Figs. 13 and 14, will then have a slight planetary movement, counterclockwise as seen from the left of Fig. 13. Stem 126 therefore swings down on the end in groove 130 as a pivot. This is equivalent to an up-swing of the stem on its ball support, and accordingly the roller precesses toward a higher speed ratio position. At the same time stem 127 swings up on its end in groove 131 as a pivot and hence roller 111 also precesses toward a higher position. Further, by reason of the described planetary movement the pins 151 (Fig. 14) which extend from plate 115 into the inclined or helical slots in sleeve 116 exert a camming effect on the sleeve which, since it can not rotate, is thereby shifted axially toward the left in Fig. 14. This axial movement of the sleeve permits the pins 151, Fig. 13, and plate 118 which carries the pins, to have a slight planetary movement also, but in the clockwise direction. This causes stems 128, 129 to swing on their ends in grooves 132, 133 as pivots, and upon reflection it will be seen that this will cause the two rollers to precess to a slightly lower speed ratio position. The net result is that the two sets are brought to the same speed position.

It will be seen that equalization of the rollers of one or both sets may take place while the two sets are equalizing, and it will also be seen that the action is entirely automatic. This is a highly advantageous feature, as it takes care of considerable inaccuracy in the manufacture and fitting of the parts, which otherwise would have to be of the highest precision. Even then, very slight unequal wear or the like would result in an unbalanced condition which would cause further unequal wear, and so on, with the result that the mechanism would in a relatively short time be seriously injured.

The equalizing method described hereinbefore is not limited to mechanisms in which sets of rollers are arranged in the same plane but can be employed to advantage when the sets are spaced apart axially. An embodiment of this type is illustrated in Figs. 18 to 25 inclusive. In this construction the disks 165, 166 correspond in general to the disks 15, 17 of Figs. 1 and 13, but are spaced apart to accommodate disk 167, which corresponds to disks 16, 18 arranged back to back. Disk 167 rotates on a sleeve 168 encircling the shaft 169 and extending axially from a three-armed spider one arm of which is shown at 170, Fig. 18, the spider being integral with a transverse plate or diaphragm 171 fixed solidly between the two parts 172, 173 of the transmission housing. On the right end of the sleeve 168 is splined a similar spider, one arm of which is shown at 174. Disk 165 is rigidly connected to shaft 169, but disk 166 is slidably keyed to the shaft, so that by tightening nut 175 against the spring washers 176 disk 166 is urged leftwardly against the three rollers between the disk mentioned and the middle disk 167, one of which rollers is shown at 177. At the same time the shaft 169 and disk 165 are drawn rightwardly against the rollers 178. Both sets of rollers are thus pressed against the middle disk to give the necessary frictional engagement to drive the middle disk when shaft 169 and disks 165, 166 are the driving element, or to rotate disks 165, 166 and shaft 169 when the middle disk is the driving element. In either case disk 167 is splined to the edge of a drum 179 which surrounds rollers 177 and is connected to shaft 180 in which the inner end of shaft 169 is mounted. Shaft 180 has a flange 181 for connection with any desired mechanism, for example a mechanism which is to drive, or be driven by, the transmission.

The transmission rollers 178 are mounted in carriers 185, Figs. 18 and 20, which are themselves rotatably supported by ball and socket joints in the rockers 186 pivoted on the spider 170, Fig. 18, and provided with inwardly extending arms 187 having ball ends engaging slots 188 in the terminal flange at the adjacent end of an equalizer sleeve 189 encircling the shaft 169. This equalizer sleeve is connected by arms or spokes 190 to an annulus or rim 191 (see also Fig. 22). The sleeve being rotatable about shaft 169 and inside of sleeve 168, it will be seen that by giving the rim 191 a slight movement of rotation in either direction the rockers 186 will be rocked correspondingly on their pivots. This movement of the rockers will either shift the carriers in line with their axes of rotation in the rockers, or tilt them about the axes on which the rollers rotate, or both shift and tilt them, according to the angular relation of the arms 187 to the ball and socket joints by which the carriers are mounted, as explained, in my copending applications Serial No. 361,031, filed May 7, 1929, now Patent No. 1,865,102, issued June 28, 1932, and Serial No. 590,360, filed April 29, 1932, now Patent No. 1,919,218, issued July 25, 1933, which were copending with my present application. In any case the rollers precess to a higher or lower speed ratio, according to the direction in which the sleeve 189 was rotated, as described in my copending patents just mentioned. Preferably the axes of precession of the rollers and carriers are inclined to the planes of the disk so that the extent of precession of the rollers and carriers will depend upon the amplitude of the rocking movement imparted to the rockers, as explained in my copending applications referred to. For this purpose the sockets in which the ball ends of the carriers are mounted may be offset as indicated in Fig. 26, in which it will be observed that the upper socket is offset to the left and the lower to the right of the vertical center line of the rocker 186. It will be understood that in Fig. 20 the upper socket of the rocker at the upper left of the figure is nearer the observer than is the lower socket of the same rocker, whereas the upper socket of the rocker at the upper right is farther from the observer than is its lower socket. Similarly the left hand socket of the lower rocker is nearer the observer than is the right hand socket of that rocker.

The rollers 177 of the other set, Fig. 18, are similarly mounted with their axes of precession inclined to the planes of the disks in a direction opposite to inclination of the first set, and the arms 193 of their rockers 194 engage slots 195 in the flange or ring 196, Figs. 18 and 19, splined in a fixed position on the adjacent end of the equalizer sleeve. It will therefore be seen that when the sleeve is rotated by rim 191 as described in connection with the first set of rollers the carriers of the second set will be similarly actuated, causing like precession of the rollers.

The slots 188, 195 at the two ends of the equalizer sleeve 189 are inclined in opposite directions for the same purpose as are the similar slots 150 in sleeve 116, Fig. 17, that is to say, to provide automatic equalization of load between the sets of rollers. It will be understood that rotative movement of the sleeve 189 is intended to rock all the rockers equally, to cause equal precessional movement of the rollers to change the speed-ratio of the mechanism. Transverse or radial movement of either or both ends of the sleeve causes differential rocking movement of one or more rockers to initiate equalizing precession of the appropriate rollers of the respective set, as does transverse or radial movement of the plate 58, Figs. 1 and 2. Longitudinal or axial movement of the sleeve equalizes the load between the two sets of rollers, as does axial movement of plate 58, just mentioned. In explanation of the equalizing action between sets of rollers, let it be noted first that the frictional forces exerted on the rollers, when the transmission mechanism is driving a load, tends to revolve the rollers around the disk axis in planetary fashion, thereby taking up all the axial play or clearance which the roller carriers have with respect to their supporting rockers. If (after this play is taken up) all the rollers are in the same speed-ratio position, then both sets drive the load at the same speed; but nevertheless the aforesaid frictional forces constantly tend to shift the rollers farther in planetary fashion, which farther shift would, if it occurred, cause precession of the rollers to a lower speed-ratio position. But this tendency is resisted by the control mechanism with which the sleeve is connected for actuation, that is, the rocker arms 187, 193, ring 191, links 198, lever 199, etc., Fig. 20; hence, when the load is equally divided between the two sets the aforesaid frictional forces cause the rocker arms 187 of one set and the rocker arms 193 of the other set to exert equal pressures on the inclined cam surfaces of the recesses which the arms engage in the collars on the equalizing sleeve. In other words, the forces on the two sets are equalized, i. e., the forces are in equilibrium, and there is no tendency for the sleeve to be cammed axially in one direction rather than in the other. But suppose that for some reason one set is in a higher speed-ratio position. Call this the "leading" set. Since it tends to drive the load faster than does the other or "lagging" set, the frictional forces due to load reaction are unbalanced and the rocker arms of one set therefore exert greater pressure on the equalizing sleeve than do the arms of the other set, with the result that the leading set can move in the planetary manner in the direction of the frictional forces on it, thereby rocking its rockers and thus causing the arms of its rockers to cam the sleeve axially. The planetary movement just referred to causes the leading set of rollers to precess toward a lower speed-ratio position, and at the same time the axial movement of the sleeve swings the rocker arms of the other set (by the cam action of the inclined recesses engaging the latter arms) in the direction to cause precession of its rollers to a higher speed-ratio position. The net result is that the two sets come to an intermediate position at which both drive the load at the same speed. At this position the load is equally divided between the two. Equalization among the rollers of a set in Figs. 2 and 20, for example, is in principle the same as between sets of rollers. Instead, however, of the sleeve being shifted axially it is shifted transversely, thereby causing differential precession of one or more rollers of the set. It will be observed that in Figs. 2, 18 and 20, the equalizing device—the single floating ring or plate 58 in Fig. 2 and the floating sleeve 189 with its two recessed collars in Figs. 18 and 20—are capable of movement axially and transversely, so that equalization among the rollers of a set, and equalization between sets, can take place concurrently. Thus the sleeve can tilt or move as a whole transversely in any direction, with or without simultaneous movement axially. In any case the action is automatic and is effective within the limits of the precessional adjustment incident to the axial play of the carriers with respect to their rockers. It will also be seen that the equalizing device functions, as such, only when there are on the rollers forces which are unequal, and that the ultimate effect of the equalization is to make a change, in the magnitude of one or more of the forces, which will make them equal.

The ring 191 and equalizing sleeve 189 are rotated to bring about change of speed-ratio by a control shaft 205 (described hereinafter) through a universal connection therewith. For this purpose the ring is connected at opposite sides by links 198, Figs. 18, 20, and 22, to a bail 199, Fig. 23, the legs 200 of which are pivoted to ears 201 on a transverse "scale beam" lever 202 fulcrumed between its ends at 203 in the plate 171 and the end wall of the housing 173. It will be observed that in all positions of the lever 202 the bail can swing up or down (in Fig. 20) on its pivotal connection with the lever, that is, in a plane transverse to the lever, thus permitting the ring 191 and sleeve 189 to tilt up or down. Also, the links 198 are loosely connected to the ring and to the bail, as by means of the ball joints shown in Figs. 23 and 25, thus giving the sleeve universal freedom of movement, permitting it to move bodily in both axial directions, to move bodily in all radial directions, and to tilt at each end in every radial direction, without being materially resisted by the connection with links 198, bail 199 and lever 202. The sleeve is thus enabled to perform in an efficient manner all the equalizing functions of sleeve 116, Fig. 13, and of disk 58, Fig. 2.

The adjustment of lever 202 to bring about changes of speed ratio is effected by means of a threaded axially stationary control shaft 205, Figs. 20 and 21, working in a non-rotatable nut 206 having trunnions 207 extending into longitudinal slots 208 in the arms of a yoke 209 pivoted at their lower ends to the adjacent end of lever 202. Between the yoke and the bearing 210 of shaft 205 is an expansion spring 211. It will be seen in the construction described that when the shaft is rotated clockwise (as seen in Fig. 24) the nut and yoke are caused to descend under the influence of spring 211, thereby rocking lever 202 and bail 199 counterclockwise, with resulting precession of the rollers to a different speed-ratio position,—to a higher speed ratio position than that shown in Figs. 18 and 20 if driving shaft 169 is rotating in the direction of the arrow. Similarly, counterclockwise rotation of the control shaft raises nut 206 and yoke 209 against the tension of spring 211, thereby rocking lever 202 and bail 199 clockwise and causing the rollers to precess to a lower speed-ratio position. At all times the rollers are subjected to the reaction of the load which the mechanism is driving, tending to shift the roller carriers in a direction to cause precession to a lower speed-ratio. This reaction is exerted against and is resisted only by the tension of spring 211, and when at any speed ratio position of the rollers and yoke 209 the reaction exceeds the spring tension the spring will yield and permit the yoke to rise and lever 202 to rock clockwise, independently of nut 206, thereby causing precession of the rollers to a correspondingly lower speed-ratio position; such independent movement of the yoke being permitted by the slot and trunnion connection between the same and the nut 206. If later the load reaction on the yoke decreases to a value less than the tension of the spring the latter depresses the yoke until the tension and the reaction are again in balance, or until the descending yoke is arrested by the nut trunnions 207.

In the path of the lever 202 as the latter is swinging to or toward a predetermined low speed-ratio position is a spring-raised button 215, Fig. 20, cooperating with an electrical contact 216 to close the same upon contact 217, these contacts being in a normally closed circuit, represented by the wires 218, which is associated or connected in any suitable way with the power means, not shown, driving the transmission mechanism. For example, when the mechanism is driven by an electric motor, the contacts may be in the motor circuit so that the latter is opened whenever the contacts 216, 217 are opened by the descending end of lever 202 as a result of manual adjustment of the control shaft 205 or as a result of load reaction acting on the rollers and roller carriers, which latter, it will be remembered, are connected to lever 202 through rockers 186, 194, equalizer sleeve 189, links 198, ring 191 and bail 199. In most cases the control button is constructed and arranged to actuate the contacts when, after the rollers have precessed into contact with the stops 170a, 174a, the lever 202 is rocked still farther.

On the control shaft bearing 210 is an index disk 220, Figs. 20 and 24, traversed by a pointer 221 on the hand crank 222, which disk may be graduated to indicate a suitable number of speed ratio positions. A nut 223 on the control shaft, having a handle 224, serves to lock the shaft in any position of adjustment.

The spring 211 has the important function of limiting the input torque of the transmission, since it is subjected to the load reaction, but its deflection corresponds at all times to the speed-ratio position of the rollers due to the fact that the yoke 209, the position of which determines the maximum speed-ratio at a given instant, rises and compresses the spring as the tension of the latter is exceeded by the load reaction. Hence by proper choice of the spring and its initial tension the input torque can be limited to any desired value in all speed-ratio positions. For example, with a constant speed driving motor the horsepower taken by the transmission can be limited to a substantially constant value.

Having now particularly described and ascertained the nature of my said invention and in what manner the same is to be performed, I declare that what I claim is:

1. In a friction transmission mechanism, in combination, a pair of axially spaced coaxial disks having inwardly facing toroidal grooves, a second pair of axially spaced coaxial disks having inwardly facing toroidal grooves, a set of friction rollers arranged substantially in a plane transverse to the axis of the disks and cooperating with the grooves of the first pair of disks, a set of friction rollers arranged substantially in the same plane as the first set and cooperating with the other pair of disks, supporting means for said rollers, and means for adjusting the rollers angularly with respect to said plane to vary the speed-ratio of the mechanism.

2. A friction transmission mechanism comprising an inner disk and an outer concentric disk encircling the first, an inner disk coaxial with the first inner disk and a second outer disk concentric with the second inner disk and encircling the same, the four disks having inwardly facing toroidal grooves; transmission rollers cooperating with the grooves in the first inner and the second outer disks; and transmission rollers cooperating with the grooves in the second inner and the first outer disks; all said rollers being in substantially the same plane and mounted for angular adjustment relative to said plane to vary the speed ratio of the mechanism.

3. A friction transmission mechanism comprising a grooved inner race element, a grooved outer race-element encircling the inner race element and concentric therewith, a coaxial driving shaft connected with one of the race-elements to drive the same, two sets of transmission rollers arranged in substantially the same plane between the race elements to drive the other race element from the driving element and mounted for angular adjustment to vary the speed of the driven disk element, and a driven shaft coaxial with the race elements and connected with the driven race element for actuation thereby.

4. A friction transmission mechanism comprising a pair of coaxial internally grooved driving disks, and a pair of internally grooved driven disks concentric with the driving disks and encircling the same; a set of transmission rollers cooperating with one of the driving disks and a driven disk; a set of transmission rollers in substantially the same plane with the first set cooperating with the other driving disk and the other driven disk; the rollers of both sets being mounted for angular adjustment relative to said plane to vary the speed ratio of the mechanism; and means extending between one of the driving disks and the encircling driven disk to effect such adjustment of the rollers.

5. In a friction transmission mechanism, in combination, an inner race-member having toroidal grooves, an outer race member encircling the same and having toroidal grooves, two sets of transmission rollers arranged in substantially the same plane to cooperate with said race elements and mounted for angular adjustment to vary the speed-ratio of the mechanism, and means extending between the race elements from outside the same into connection with the rollers to vary their angular adjustment.

6. A friction transmission mechanism comprising a disk element composed of two coaxial grooved disks, a roller element composed of two connected sets of transmission rollers arranged in substantially the same plane and cooperating with the said disk element, and a disk element composed of coaxial grooved disks encircling the first disk element and cooperating with the roller element; one of the three elements being non-revolvable and constituting a reaction element.

7. In a variable speed friction transmission mechanism, in combination, toroidally grooved coaxial races spaced axially apart, an intermediate toroidally grooved race coaxial with said coaxially spaced races, two sets of transmission rollers cooperating with said races, supports for the rollers of the two sets angularly adjustable respectively in opposite angular directions on axes transverse to their roller axes of rotation to vary the speed ratio of the mechanism, an axially movable equalizing member, and means operatively associating the rollers of both sets with the equalizing member for converting axial movement of the latter into movement of angular adjustment of both sets of rollers respectively in the same angular direction to bring both sets to the same intermediate speed ratio position.

8. In a variable speed friction transmission mechanism, in combination, a driving shaft, a driven shaft, and mechanism for driving the latter from the former, comprising coaxial toroidally grooved disks, four transmission rollers arranged in two sets cooperating with the grooves in the disks, carriers for the rollers, mounted for precessional adjustment of the rollers to vary the speed-ratio of the mechanism, and actuating members connected with the carriers to cause such precessional adjustment; and means for automatically equalizing between the two sets of rollers a load driven by the driven shaft, comprising an axially movable member encircling one of said shafts and having recesses engaging said actuating members, whereby the actuating members of either set of rollers can shift the axially movable member and thereby shift the actuating members of the other set.

9. In a variable speed transmission mechanism, in combination, toroidally grooved coaxial disks, transmission rollers arranged in two sets cooperating with the grooves in said disks and mounted for angular adjustment induced by tilting the rollers on axes passing through their points of contact on the disks, a load equalizing member encircling the disk axis and movable axially relative to the disks, radially extending arms supporting said rollers, and means operatively associating the equalizing member and said arms for equalizing actuation of the arms by the equalizing member and of the equalizing member by the arms.

10. A variable speed friction transmission mechanism as claimed in claim 9, in which the axially movable member is also movable transversely or radially of the disk axis to equalize the rollers of each set.

11. In a variable speed friction transmission mechanism, in combination, coaxial disks having toroidal grooves in their opposed faces, friction rollers cooperating with the disks, carriers for the rollers, radial supporting arms for the carriers having ball-and-socket supporting connection therewith, a shiftable control member having helical grooves, and stems extending from the roller carriers into engagement with the helical grooves in said control member to cause precession of the rollers when said member is shifted.

12. In a variable speed friction transmission mechanism, in combination, coaxial disks having toroidal grooves in their opposed faces, friction rollers arranged in sets and cooperating with the disks, carriers for the rollers, radial supporting arms for the carriers having ball-and-socket supporting connection therewith, a shiftable control member having helical grooves, stems extending from the roller carriers into engagement with the helical grooves in said control member to cause precession of the rollers when said member is shifted, and an axially and radially movable load equalizing member operatively associated with said arms to equalize the rollers of each set with respect to each other and to equalize each set with respect to the other set.

13. A friction transmission mechanism comprising an inner disk and an outer concentric disk encircling the first, an inner disk coaxial with the first inner disk and a second outer disk concentric with the second inner disk and encircling the same; friction transmission rollers cooperating with the first inner and the second outer disks; and transmission rollers cooperating with the second inner and the first outer disks; all said rollers being in substantially the same plane.

14. A transmission mechanism as in claim 4, in combination with means for equalizing the load amongst the rollers.

15. In a variable speed power transmission mechanism, in combination, toroidally grooved coaxial friction disks, friction rollers arranged in sets to cooperate with the grooves in said disks and adapted for rocking adjustment on axes transverse to their axes of rotation to vary the speed ratio of the mechanism, supports for the rollers adapted to rock on said transverse axes, and a universally movable equalizing member operatively associated with the roller supports.

16. In a variable speed power transmission mechanism, in combination, toroidally grooved coaxial friction disks, friction rollers cooperating with the grooves in said disks and adapted for precessional rocking adjustment to vary the speed ratio of the mechanism, supports for the rollers adapted to rock on axes transverse to the roller axes of rotation, a rotatable universally movable equalizing member connected with the roller supports, and control means operatively associated with said equalizing member to rotate the same.

17. In a variable speed power transmission mechanism, in combination, inner and outer toroidally grooved coaxial friction disks, a shaft extending through the disks and connected with at least one of the disks to drive the same, friction rollers arranged in sets to cooperate with said disks, a universally movable equalizing sleeve, encircling the shaft between two of the disks, supports for the rollers adapted for precessional adjustment thereof to vary the speed ratio of the mechanism, means operatively associating the equalizing sleeve with the roller supports to actuate the latter to initiate precession of the rollers and to equalize the same, and means for actuating the equalizing sleeve to initiate precession of the rollers.

18. In a variable speed power transmission mechanism, in combination, toroidally grooved coaxial friction disks, friction rollers cooperating with the disks and adapted for precessional adjustment to vary the speed ratio of the mechanism, an equalizing member operatively associated with the rollers to equalize the same and to initiate precession thereof, and means to actuate the equalizing member without impeding the equalizing operation thereof, said means comprising a lever fulcrumed between its ends, a lever connected thereto to swing transversely thereof, and links connecting the last named lever with the equalizing member to actuate the same.

19. In a variable speed power transmission mechanism, in combination, toroidally grooved coaxial friction disks, friction rollers cooperating with the disks and adapted for precessional adjustment to vary the speed ratio of the mechanism, a coaxial equalizing sleeve operatively associated with the rollers to equalize the same and rotatable to initiate precession thereof, and means to rotate the equalizing sleeve without impeding the equalizing operation thereof, said means comprising a lever fulcrumed between its ends, a bail connected thereto to swing transversely thereof, and links connecting the last named lever with the equalizing sleeve to actuate the same.

20. In a friction transmission mechanism, in combination, outer coaxial friction disks having toroidal grooves in their inner faces, an intermediate friction disk between the outer disks, coaxial therewith and having toroidal grooves in its faces, and non-planetary transmission rollers arranged in sets cooperating with the inner and outer disks; carriers for the rollers adapted for precessional adjustment thereof on axes transverse to the roller axes of rotation; a rotary and transversely movable equalizing member, and supports for the roller carriers mounted to rock and thereby initiate such precessional adjustment; said supports operatively associated with said control and equalizing member to be rocked equally by rotary movement of said member and differentially upon transverse movement thereof.

21. In a friction transmission mechanism, in combination, outer coaxial friction disks having toroidal grooves in their inner faces, an intermediate friction disk between the outer disks, coaxial therewith and having toroidal grooves in its faces, and non-planetary transmission rollers arranged in sets cooperating with the inner and outer disks; carriers for the rollers, mounted for precessional adjustment of the rollers on axes transverse to the roller-axes of rotation; supports for the roller carriers mounted to rock and thereby initiate such precessional adjustment; and combined control and equalizing means, comprising a rotary and transversely movable sleeve coaxial with and between the outer disks, members operatively associated with said supports and with the sleeve at the ends of the latter to rock said supports equally for change of speed ratio of the mechanism when the sleeve is rotated and to rock said supports differentially for equalization of the rollers of a set when the sleeve is moved transversely.

22. In a friction transmission mechanism, in combination, outer coaxial friction disks having toroidal grooves in their inner faces, an intermediate friction disk between the outer disks, coaxial therewith and having toroidal grooves in its faces, and non-planetary transmission rollers arranged in sets cooperating with the inner and outer disks; carriers for the rollers, mounted for precessional adjustment of the rollers on axes transverse to the roller-axes of rotation; supports for the roller carriers mounted to rock and thereby initiate such precessional adjustment; and a universally movable combined control and equalizing member coaxial with and between the outer disks, and having cam connection with said supports to rock the latter.

23. In a variable speed power transmission mechanism, in combination, toroidally grooved coaxial friction disks, friction rollers arranged in sets to cooperate with the grooves in said disks and adapted for precessional adjustment to vary the speed-ratio of the mechanism, a load-equalizing member movable axially and transversely and common to both sets of rollers, and means operatively associating the equalizing member with the rollers, said equalizing member and said means having camming engagement with each other.

24. In a variable speed friction transmission mechanism, in combination, a driving shaft; a driven shaft; means for driving the latter from the former, comprising toroidally grooved coaxial disks, two sets of transmission rollers cooperating with said disks, and supports for the rollers mounted for angular adjustment therewith to vary the speed-ratio of the mechanism; an axially movable equalizing member; means constructed and arranged to convert axial movement of the equalizing member into a movement of the roller supports of one set for initiating precessional adjustment of the rollers of that set toward a higher or lower ratio position, and into a movement of the roller supports of the other set for initiating precessional adjustment of said other set of rollers reversely toward a lower or higher ratio position.

25. In a variable speed power transmission mechanism, in combination, toroidally grooved coaxial friction disks, two sets of friction rollers cooperating with the grooves in said disks and adapted for precessional adjustment to vary the speed ratio of the mechanism, an axially movable equalizing member having corresponding sets of oppositely inclined actuating surfaces, two sets of means connected with the rollers and cooperating respectively with said sets of inclined surfaces for actuation thereby to displace the axes of the rollers of one set to one side of the disk axis and the axes of the rollers of the other set to the opposite side of said disk axis in order to initiate equalizing precession of the rollers of both sets.

26. In a variable speed power transmission mechanism, in combination, toroidally grooved coaxial friction disks, friction rollers cooperating with the grooves in said disks and adapted for precessional adjustment to vary the speed ratio of the mechanism, an axially movable equalizing member having oppositely inclined actuating surfaces, and means connected with the rollers and cooperating with the said inclined surfaces for actuation thereby to initiate equalizing precession of one or more of the rollers toward a higher or lower speed ratio and one or more other rollers toward a lower or higher speed ratio position and thereby equalize the roller positions.

27. In a variable speed power transmission mechanism, in combination, toroidally grooved coaxial friction disks, friction rollers arranged in sets to cooperate with the grooves in said disks and adapted for precessional adjustment to vary the speed-ratio of the mechanism, an axially movable load-equalizing member common to both sets of rollers, and means operatively associating the equalizing member with the rollers, said member and said means having camming engagement with each other to initiate equalizing precession of the sets of rollers toward mutually opposite speed-ratio positions.

28. In a variable speed power transmission mechanism, in combination, toroidally grooved coaxial friction disks, friction rollers arranged in sets to cooperate with the grooves in said disks and adapted for precessional adjustment to vary the speed-ratio of the mechanism, an axially movable load-equalizing member having inclined actuating surfaces, and means cooperating with said surfaces and operatively associating the equalizing member with the rollers to initiate equalizing precession of the sets of rollers towards mutually opposite speed-ratio positions.

29. In a variable speed power transmission mechanism, in combination, coaxial friction disks having toroidal grooves, friction rollers arranged in sets cooperating with different grooves in said disks, a load-equalizing and speed-ratio control member common to the two sets of rollers and having oppositely inclined actuating surfaces, and means cooperating with the inclined surfaces of the control and equalizing member and operatively associating the same with the rollers to initiate equalizing precession of the sets of rollers towards mutually opposite speed-ratio positions.

30. In a variable speed power transmission mechanism, in combination, two coaxial toroidally grooved disks and a set of precession friction rollers cooperating therewith, an automatic load-equalizing member movable bodily as a whole, carrying all the rollers of the set for rotation on their own axes and for precession to vary the speed ratio of the mechanism, and a precession-initiating control member operatively associated with each roller of the set and movable independently of the load-equalizing member to impart precession-initiating actuation to all the said rollers simultaneously.

31. In frictional power transmitting mechanism, the combination of coaxial spaced apart races having toroidal raceways; a set of tiltable intermediate rollers in tractive engagement with said raceways whereby torque may be transmitted from one race to the other, and a single, floating roller supporting means, on which all of said rollers are mounted responsive to the variations of torque transmitted by any one of the several rollers for adjusting all of the rollers to positions in which they transmit equal torque.

32. In frictional power transmitting mechanism, the combination of coaxial spaced apart races having toroidal raceways, intermediate tiltable rollers in tractive engagement with said raceways whereby torque may be transmitted from one race to the other, and a normally centered floating roller support capable of movement transversely of the race axis, whereby excessive torque transmitted by one roller will cause the floating support to move transversely thus displacing the axes of all rollers thereby inducing them to tilt to equally distribute the torque load among the rollers.

FRANK A. HAYES.